J. W. HORNSEY.
FLEXIBLE JOINT.
APPLICATION FILED JULY 15, 1910. RENEWED JUNE 8, 1915.

1,263,415.
Patented Apr. 23, 1918.
4 SHEETS—SHEET 1.

Attest:

Inventor:
John W. Hornsey
by
Clarence ... Attys.

J. W. HORNSEY.
FLEXIBLE JOINT.
APPLICATION FILED JULY 15, 1910. RENEWED JUNE 8, 1915.

1,263,415.

Patented Apr. 23, 1918.
4 SHEETS—SHEET 3.

Attest:
Edgeworth Greene
W. McGinis by

Inventor:
John W. Hornsey
Clarence O. Kew Att'ys.

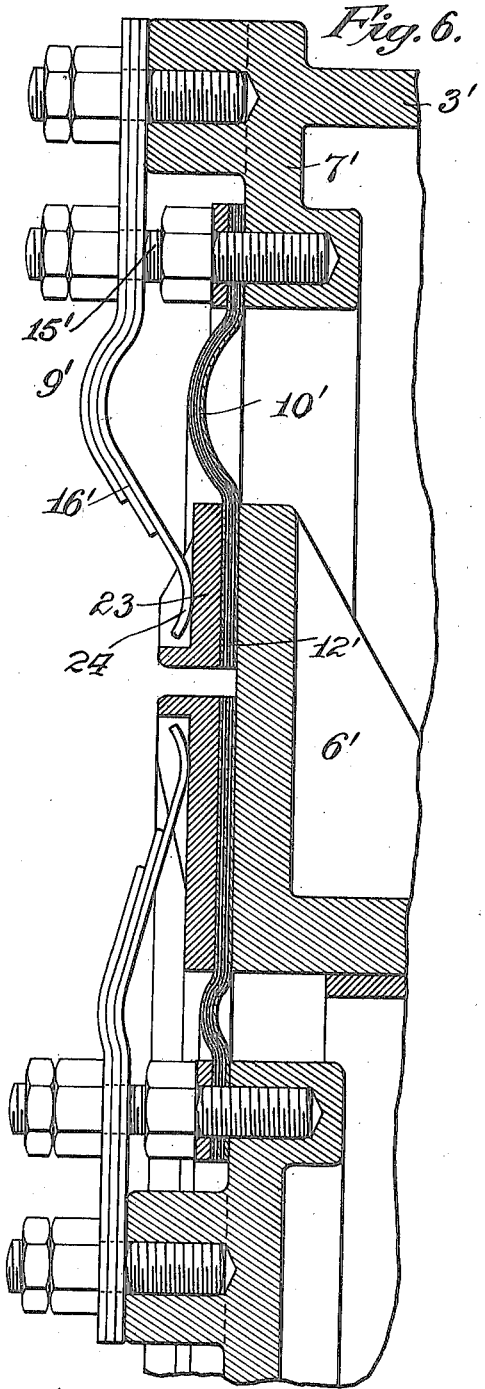

UNITED STATES PATENT OFFICE.

JOHN W. HORNSEY, OF SUMMIT, NEW JERSEY, ASSIGNOR TO GENERAL REDUCTION GAS AND BY-PRODUCTS COMPANY, A CORPORATION OF DELAWARE.

FLEXIBLE JOINT.

1,263,415.     Specification of Letters Patent.     Patented Apr. 23, 1918.

Application filed July 15, 1910, Serial No. 572,135. Renewed June 8, 1915. Serial No. 32,991.

*To all whom it may concern:*

Be it known that I, JOHN W. HORNSEY, a citizen of the United States, residing at Summit, Union county, New Jersey, have invented new and useful Improvements in Flexible Joints, of which the following is a specification, reference being had to the accompanying drawings, in which—

Figure 1:
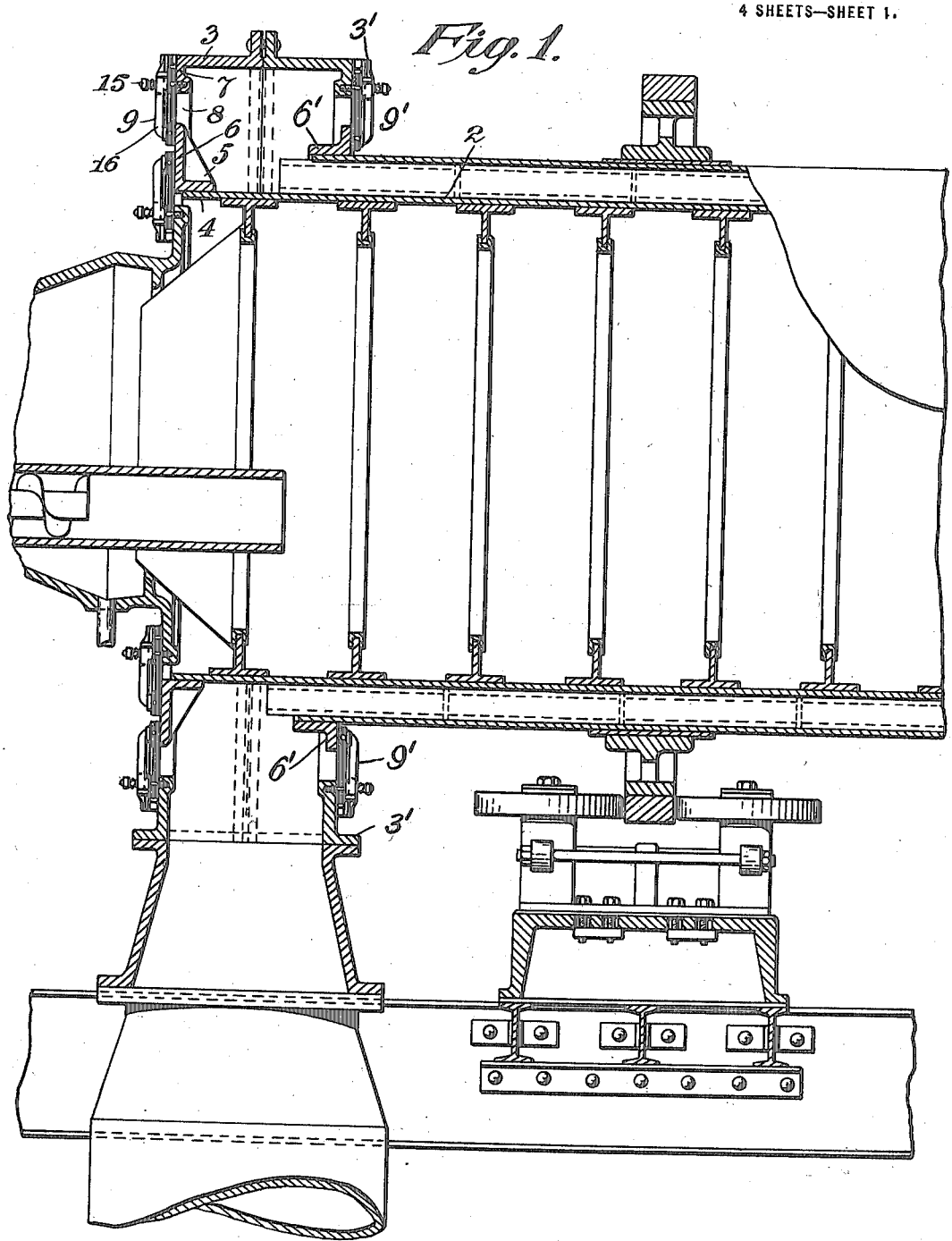
Figure 2:
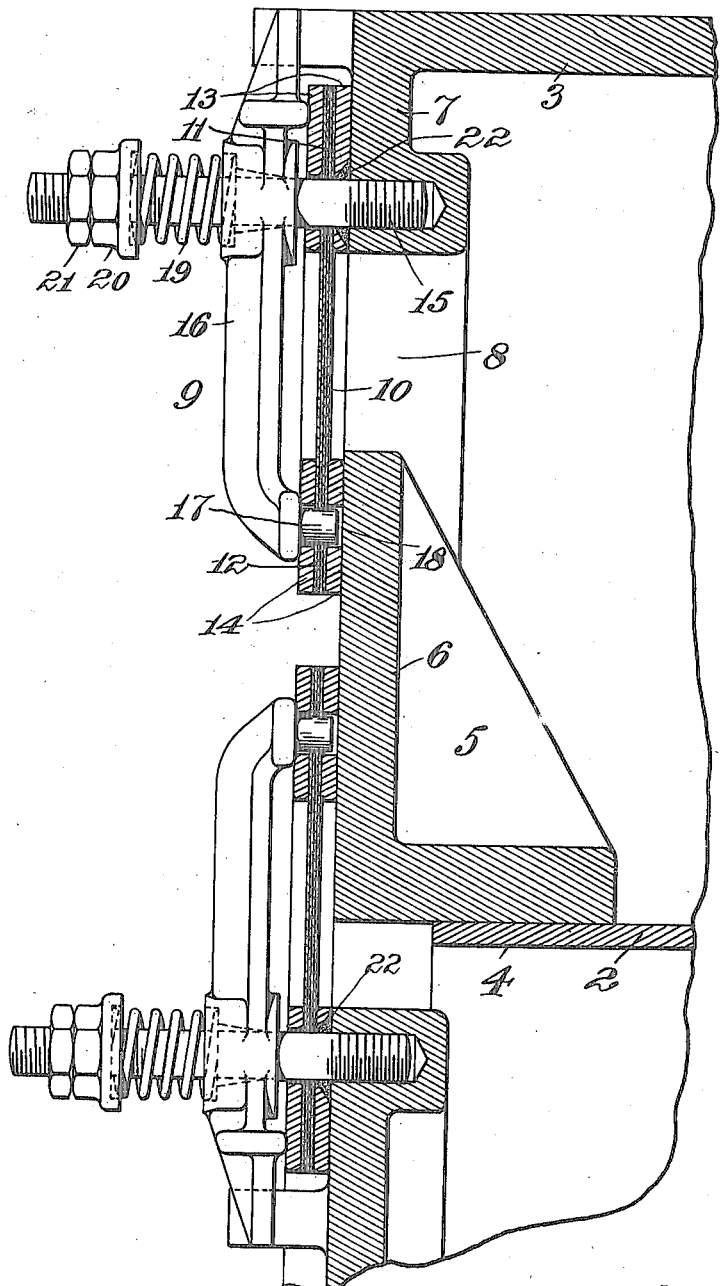
Figure 3:
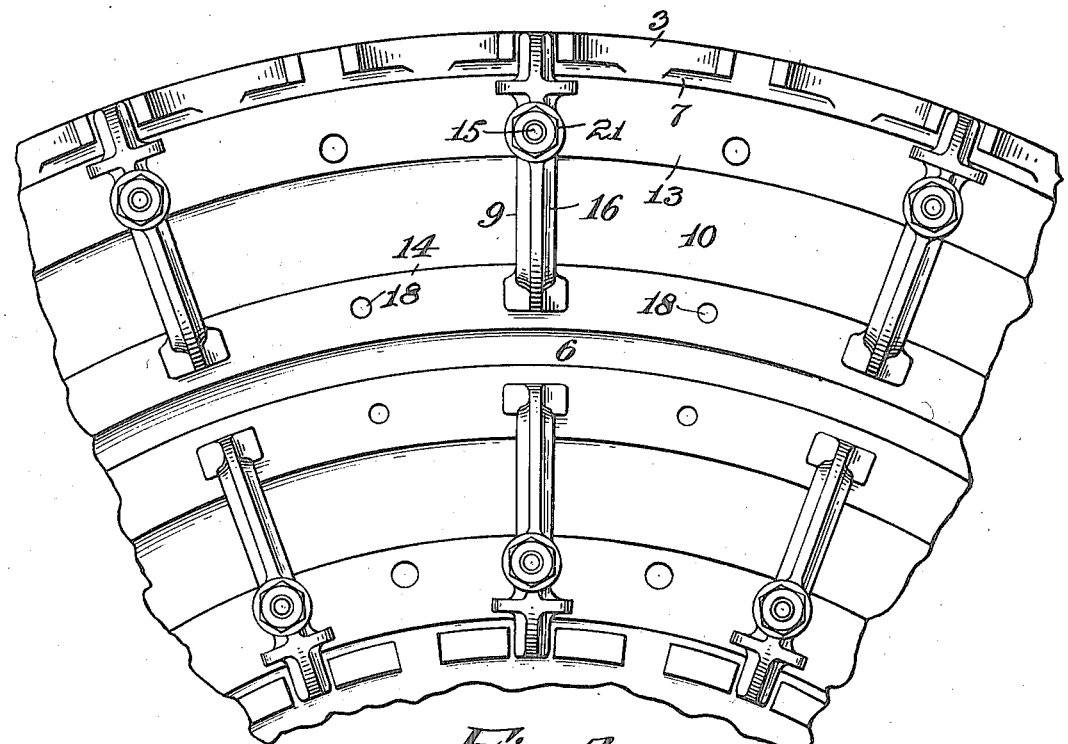
Figure 4:
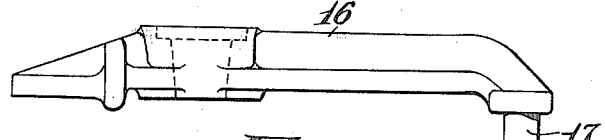
Figure 5:
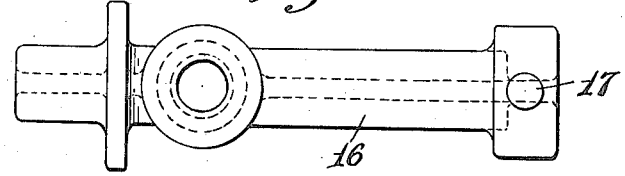

Figure 1 is a section partly in elevation of apparatus, showing the application of my device. Fig. 2 is an enlarged detail section of Fig. 1. Fig. 3 is a detail front elevation of Fig. 1. Figs. 4 and 5 are details of lever, and Fig. 6 shows a section of a modification of my device.

My invention relates to joints which are designed to make gas, water or dust-tight connections between parts of apparatus which are movable relatively to each other. My invention is especially valuable when used with rotary apparatus to make a gas, water or dust-tight connection with stationary piping or parts. For this purpose I provide a flexible diaphragm or joint connection between the rotary apparatus and the fixed part which provides for the expansion and contraction of the fixed or moving parts, and at the same time maintains a closed joint therebetween. It furthermore reduces the friction and wear of the joint forming parts to a minimum and secures an efficient action of the joint regardless of the material being treated.

Referring to the drawings I have shown my invention as applied to one end of a rotary cylinder and fixed parts such as are shown and described in my companion applications filed of even date herewith. 2 is a rotary cylinder, and 3 is a fixed head or stationary part within which the end 4 of the cylinder 2 revolves. Attached to the end 4 of the cylinder 2 is a ring 5 having a vertical extending annular flange 6. Upon the vertical surface 7 of the fixed part 3 and adjacent to the opening 8 is mounted the flexible joint 9, which is preferably composed of a plurality of thin plates 10 of sheet metal. The joint 9, which I have shown here in the form of an annulus, preferably has its edges 11 and 12 reinforced to provide rigid bearing parts 13 and 14 respectively, the part 13 of which is rigidly attached to the surface 7 by the bolts 15 near the edge of the annular opening 8, and the part 14 of which bears against the flange 6. Upon each of the bolts 15 is mounted a lever 16, the point 17 of which fits in a socket 18 in the bearing part 14. The spring 19 mounted on each of the bolts 15 is held under compression against the lever 16 by the nuts 20 and 21, while the point 17 of the lever 16 presses the bearing part 14 against the movable part or flange 6. Suitable washers or packing 22 may be employed, if desired, in connection with the bearing part 13.

It will thus be seen that the bearing parts 13 of the flexible joint 9 will always be held firmly against the flange 7 by the levers 16 and springs 19 and that contraction or expansion or wear of parts will not affect the efficiency of the joint since its flexible middle section will permit its distortion to meet varying conditions.

I have also shown joint 9' mounted on the fixed parts 3', which bear on moving part 6' and maintain gas, water or dust-tight connection between fixed and moving parts.

In Fig. 6 I show a modification in which the joint 9' is composed of a plurality of thin sheets 10' rigidly attached to the surface 7' by the bolts 15' and its end 12' clamped against the moving part 6' by leaf spring lever 16' which is bolted to the surface 7'. To prevent the sheets 10' from buckling I preferably insert a rigid ring 23 between the clamping point 24 of the leaf spring 16' and the edge 12'.

While I have described my joint as being constructed of metal it is obvious that any other materials may be used which will provide a flexible section and suitable bearing parts. I have shown the flexible plates as annuli, but they may be made in segments built up, with joints staggered, and, obviously, the plates and joints may be made straight or in other shapes instead of in annular form when desired. The flexible plates may be attached to the moving part and bear upon the stationary part, and many other changes may be made by those skilled in the art without departing from the spirit of my invention. Moreover, my invention is not confined to use in apparatus of the character shown, but may also be used wherever a joint between a fixed and a moving part, or between moving parts, is desired.

I claim:

1. A joint between two relatively movable parts comprising two bearing members, a flexible connection therebetween and a pressure member, said flexible connection and said pressure member being secured to one of said bearing members and to one of said parts, the other of said bearing members being held against the other of said parts by said pressure member.

2. A joint between two relatively movable parts, said joint consisting of a plurality of flexible metallic plates having reinforced bearing surfaces at its ends, a lever securing the plates to one of said parts through one of said bearing surfaces and bearing upon the other of its bearing surfaces to hold such surface against the other of said parts, and compression means for causing the lever to exert pressure upon both of said bearing surfaces.

3. A joint between two relatively movable parts, said joint consisting of a flexible member, said flexible member being attached to one of said parts and bearing on the other of said parts, and being arranged transversely to the line of pressure against the joint, a pressure member having one end fixed to the part to which the flexible member is attached and having its other end bearing upon the free end of the flexible member to press it against the other of said parts.

4. A joint between two relatively movable parts, said joint consisting of a flexible diaphragm attached to one of said parts and adapted to bear upon the other of said parts, and a spring-operated arm having one end connected to the part to which the flexible diaphragm is attached, and having its other end bearing against the free end of the diaphragm to press it against the other of said parts.

5. A joint between two relatively movable parts, said joint consisting of a plurality of flexible plates, a pressure member, one end of the said plates and one end of the pressure member being secured to one of said parts, and the other end of said plates being forced to bear against the other of said parts by the said pressure member.

6. A joint between two relatively movable parts, said joint consisting of a flexible diaphragm attached to one of said parts and adapted to bear on the other of said parts, and a lever having one end connected to one of said parts, and having a spring for pressing the free end of the lever against the free end of the diaphragm to hold it tightly against the part moving relatively to it.

JOHN W. HORNSEY.

Witnesses:
R. I. MIDDLETON,
G. HANSEN.